United States Patent
Mizuno (10) Patent No.: US 7,693,018 B2
(45) Date of Patent: Apr. 6, 2010

(54) OPTICAL DISK RECORDING AND REPRODUCING DEVICE

(75) Inventor: Takao Mizuno, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 659 days.

(21) Appl. No.: 11/600,086

(22) Filed: Nov. 16, 2006

(65) Prior Publication Data

US 2007/0058511 A1 Mar. 15, 2007

(30) Foreign Application Priority Data

Dec. 1, 2005 (JP) ............................. 2005-347438

(51) Int. Cl.
*G11B 15/62* (2006.01)
(52) U.S. Cl. .................. 369/53.19; 369/44.32
(58) Field of Classification Search .............. 369/53.19, 369/44.32, 44.11
See application file for complete search history.

(56) References Cited

U.S. PATENT DOCUMENTS

| 6,128,258 | A * | 10/2000 | Kimura et al. | 369/44.32 |
|---|---|---|---|---|
| 6,137,754 | A * | 10/2000 | Furukawa et al. | 369/44.32 |
| 6,160,772 | A * | 12/2000 | Muramatsu | 369/44.32 |
| 6,434,096 | B1 * | 8/2002 | Akagi et al. | 369/44.32 |
| 6,577,568 | B1 * | 6/2003 | Konishi et al. | 369/44.32 |
| 6,690,632 | B1 * | 2/2004 | Sato et al. | 369/53.19 |
| 7,145,848 | B2 * | 12/2006 | Konishi et al. | 369/44.32 |
| 7,212,475 | B2 * | 5/2007 | Takeda | 369/44.32 |
| 2002/0021640 | A1 * | 2/2002 | Fujita et al. | 369/53.19 |
| 2003/0189883 | A1 * | 10/2003 | Konishi et al. | 369/44.32 |

(Continued)

FOREIGN PATENT DOCUMENTS

JP A-2003-016678 1/2003

(Continued)

OTHER PUBLICATIONS

Ronald E. Gerber et al., "Tilt Correction in an Optical Disk System", Applied Optics, vol. 35, No. 35, Dec. 1996, pp. 7000-7007.*

*Primary Examiner*—Thuy N Pardo
(74) *Attorney, Agent, or Firm*—Morgan Lewis & Bockius LLP (57) ABSTRACT

A system controller of an optical disk recording and reproducing device writes test data in a test writable area of a loaded optical disk if it is an unused disk and calculates a maximum amplitude value of an RF signal at an inner radius. Then, it calculates the maximum amplitude value of a tracking error signal at the inner radius and further calculates the maximum amplitude value of the tracking error signal at the outer radius. After that, it calculates a primary approximate expression about a tilt from the maximum amplitude value of the tracking error signal at the inner radius and the maximum amplitude value of the tracking error signal at the outer radius. It further offsets the primary approximate expression by a difference between the tilt values that is obtained by subtracting the maximum amplitude value of the tracking error signal at the inner radius from the maximum amplitude value of the RF signal at the inner radius. As a result, a tilt control is performed in accordance with the RF signal of the virtual maximum amplitude value that is obtained by adding the difference between the tilt values to the primary approximate expression.

2 Claims, 4 Drawing Sheets

U.S. PATENT DOCUMENTS

| | | | |
|---|---|---|---|
| 2003/0223337 A1* | 12/2003 | Kimura et al. | 369/53.19 |
| 2004/0037195 A1* | 2/2004 | Sasaki et al. | 369/53.19 |
| 2004/0145977 A1* | 7/2004 | Sakai et al. | 369/44.32 |
| 2004/0156278 A1* | 8/2004 | Takeda | 369/44.32 |
| 2004/0190404 A1* | 9/2004 | Konishi et al. | 369/44.11 |
| 2005/0047291 A1* | 3/2005 | Kuze et al. | 369/44.32 |
| 2006/0002254 A1* | 1/2006 | Ishihara et al. | 369/44.32 |

FOREIGN PATENT DOCUMENTS

| | | |
|---|---|---|
| JP | A-2003-346369 | 12/2003 |
| JP | A-2004-095035 | 3/2004 |

* cited by examiner

OPTICAL DISK RECORDING AND REPRODUCING DEVICE

This application is based on Japanese Patent Application No. 2005-347438 filed on Dec. 1, 2005, the contents of which are hereby incorporated by reference.

BACKGROUND OF THE INVENTION

1. Field of the Invention

The present invention relates to an optical disk recording and reproducing device for recording and reproducing information on an optical disk. In particular, the present invention relates to a control of correcting tilt of an optical pickup with respect to the optical disk.

2. Description of Related Art

Conventional optical disk recording and reproducing devices have an optical pickup that emits a laser beam, which is focused through an objective lens to form a light spot having a diameter of approximately 0.5 µm, for example. Thus, information can be recorded on the optical disk along tracks having a pitch of approximately 0.74 µm, for example, and information recorded along tracks can be reproduced. If the optical axis of the laser beam projected to the surface of the optical disk is not perpendicular to the surface of the optical disk but has some relative tilt error, the light spot may swell to a neighboring track. In this case, information of the neighboring track may be mixed, and aberration may be generated in the light spot on the surface of the optical disk, resulting in substantial deterioration of recording and reproducing quality.

This deterioration of recording and reproducing quality may become a serious problem if the optical disk recording and reproducing device has the optical pickup with a large numerical aperture of the objective lens for realizing high density. Therefore, it is important to control the tilt error of the optical axis of the laser beam with respect to the surface of the optical disk under a predetermined angle. For this purpose, the optical disk recording and reproducing device is required to have a tilt correcting mechanism for controlling the tilt of the optical pickup so as to correct the tilt error in accordance with warp or tilt of the optical disk.

The conventional optical disk recording and reproducing device performs a tilt control of the optical pickup by calculating a maximum amplitude value of an RF signal that is read out from the optical disk if the optical pickup has no tilt sensor, so as to adjust the optical pickup to be a tilt position corresponding to the calculated value. In addition, since an unused optical disk has no RF signal, it is difficult to adjust the optical pickup to be the tilt position corresponding to the maximum amplitude value of the RF signal even if the optical pickup has a variable radial tilt function. Therefore, for an unused optical disk, a tilt adjustment value when a tracking error signal that can be adjusted without the RF signal becomes a maximum amplitude value is usually adopted. However, even if the tilt position of the optical pickup is adjusted at the time point when the tracking error signal becomes the maximum amplitude value, it does not always mean that light to the optical pickup becomes the best state, which can cause deterioration of the recording quality.

For example, JP-A-2004-95035 discloses a conventional technique that utilizes a property that there is a difference of a predetermined offset quantity between the radial tilt correction quantity when the amplitude value of the RF signal read out from the optical disk becomes the maximum and the radial tilt correction quantity when the amplitude value of a land prepit signal becomes the maximum, and the difference does not change regardless of a position on the optical disk, for the tilt correction. In this technique, an optimal correction quantity is determined as the radial tilt correction quantity when the amplitude value of the RF signal becomes the maximum for a used disk, while it is determined for an unused disk by considering the above-mentioned offset quantity that is added to the radial tilt correction quantity when an amplitude value of a land preset signal becomes the maximum.

This patent document says that even an optical disk has a warp, the tilt quantity when the amplitude value of the RF signal becomes the maximum and the tilt quantity when the amplitude value of the land prepit signal becomes the maximum have the same offset regardless of a radial position on the optical disk. However, when information is recorded on an unused disk having a warp, the radial tilt correction quantity corresponding to the radial position when the amplitude value of the land prepit signal at the inner radius of the optical disk becomes the maximum is different from the radial tilt correction quantity corresponding to the radial position when the amplitude value of the land prepit signal at the outer radius of the optical disk becomes the maximum, for example. Nevertheless, this patent document does not disclose a radial position on the optical disk of the radial tilt correction quantity that is used. Therefore, it is not always possible to determine the optimal correction quantity for an unused disk by considering the offset added to the radial tilt correction quantity when the amplitude value of the land preset signal becomes the maximum.

Furthermore, JP-A-2003-16678 discloses another conventional technique for controlling a tilt of an optical pickup. This technique uses a tilt changing portion that changes a tilt quantity between an information surface on the optical disk and a laser beam with respect to a reference angle as a center by changing an angle of the optical pickup with respect to an information quantity, while it calculates an amplitude value of the maximum tracking error signal with respect to a tilt quantity detected by a tilt detecting portion. In accordance with a relationship between the measured tilt quantity and the amplitude value of the tracking error signal, the tilt of the optical pickup is controlled so that the amplitude value of the tracking error signal becomes the maximum.

As the maximum value of the amplitude of the tracking error signal, an average value is used. This average value is obtained by measuring 1/n of a time period necessary for a predetermined number of rotations of the spindle motor, detecting the maximum value of the amplitude of the tracking error signal every n rotations and calculating the average value of the maximum value of the amplitude of the tracking error signal detected n times. Therefore, even if an average value of the maximum value of the amplitude of the tracking error signal is determined by detecting the maximum value of the amplitude of the tracking error signal every n rotations at the inner radius of the optical disk that has a warp, the maximum value of the amplitude of the tracking error signal may be changed at the outer radius in accordance with a state of the warp of the optical disk. Therefore, the determined average value of the maximum value of the amplitude of the tracking error signal is not reliable for a precise tilt control of the optical pickup.

In addition, JP-A-2003-346369 discloses still another conventional technique for a tilt control of an objective lens of the optical pickup. According to this technique, in the case of an unused disk, a warp of an optical disk is detected from an offset of the push-pull tracking error signal. A signal indicating the detected warp is regarded as a tilt correcting signal that is used for the tilt control of an objective lens of the optical pickup. Although the tilt correcting signal is due to the offset of the push-pull tracking error signal, it does not disclose about the RF signal. Therefore, it is not always possible to perform the tilt control such that the amplitude value of the RF signal becomes the maximum.

SUMMARY OF THE INVENTION

An object of the present invention is to provide an optical disk recording and reproducing device that enables a tilt control by using an RF signal of a virtual maximum amplitude value for an unused disk.

An optical disk recording and reproducing device according to the present invention has a tilt correcting mechanism for correcting so that a laser beam emitted from an optical pickup becomes perpendicular to the optical disk when information is recorded or reproduced on the optical disk. The device is equipped with a system controller for performing a tilt control of the optical pickup by using an RF signal of a virtual maximum amplitude value that is obtained by the steps of calculating a primary approximate expression about a tilt from at least a first predetermined position and a maximum amplitude value of a tracking error signal at a second predetermined position on the optical disk, calculating a difference between the tilt values by subtracting the maximum amplitude value of the tracking error signal at the first predetermined position from the maximum amplitude value of the RF signal at the first predetermined position, and offsetting the difference between the tilt values to the primary approximate expression.

In this structure, if the loaded optical disk is an unused disk, a tracking error signal is used because the optical disk does not output an RF signal. In this case, a primary approximate expression about a tilt is calculated from at least a first predetermined position and a maximum amplitude value of a tracking error signal at a second predetermined position on the optical disk. Then, a difference between the tilt values is calculated by subtracting the maximum amplitude value of the tracking error signal at the first predetermined position from the maximum amplitude value of the RF signal at the first predetermined position. Further, the difference between the tilt values is offsetted to the primary approximate expression so that the RF signal of the virtual maximum amplitude value is generated. This RF signal of the virtual maximum amplitude value is used for the tilt control of the optical pickup.

According to this structure, the tilt value corresponding to the tilt value by the RF signal of the maximum amplitude value can be set even for an unused disk without an RF signal. Thus, it is possible to perform the tilt control by the RF signal of the virtual maximum amplitude value for the unused disk. Therefore, even if the optical pickup has no tilt sensor, the tilt control of the optical pickup can be performed precisely so that recording quality of information is improved when information is recorded on an unused disk.

In a preferred embodiment of the present invention, the system controller includes a test data write control portion for writing test data in a test writable area of an unused writable optical disk if it is determined that the optical disk is loaded, an RF signal maximum amplitude value calculating portion for calculating a maximum amplitude value of the RF signal at the first predetermined position on the optical disk when the test data are read out from the test writable area, a tracking error signal maximum amplitude value calculating portion for calculating the maximum amplitude value of the tracking error signal at the first predetermined position on the optical disk and for calculating the maximum amplitude value of the tracking error signal at the second predetermined position that is a predetermined distance away from the first predetermined position, a primary approximate expression calculating portion for calculating the primary approximate expression about the tilt from the calculated maximum amplitude value of the tracking error signal at the first predetermined position and the calculated maximum amplitude value of the tracking error signal at the second predetermined position, a tilt value difference calculating portion for calculating a difference between the tilt values by subtracting the maximum amplitude value of the tracking error signal at the first predetermined position from the maximum amplitude value of the RF signal at the first predetermined position, an offset portion for offsetting the difference between the tilt values to the primary approximate expression, and a tilt control portion for performing the tilt control of the optical pickup by using the RF signal of the virtual maximum amplitude value that is offsetted to the primary approximate expression.

Therefore, the system controller can realize a test data write control process, an RF signal maximum amplitude value calculating process, a tracking error signal maximum amplitude value calculating process, a primary approximate expression calculating process, a tilt value difference calculating process, an offset process and a tilt control process. Thus, a tilt value can be set also for an unused disk without an RF signal corresponding to the tilt value by the RF signal of the maximum amplitude value, so that the tilt control by the RF signal of the virtual maximum amplitude value can be performed for the unused disk.

In another preferred embodiment of the present invention, the first predetermined position is an inner radius of the optical disk while the second predetermined position is an outer radius of the optical disk. Therefore, the primary approximate expression about the tilt with respect to a warp of the optical disk can be calculated easily.

As described above, according to the present invention, a tilt value can be set also for the unused disk without an RF signal corresponding to the tilt value by the RF signal of the maximum amplitude value. Thus, a tilt control by the RF signal of the virtual maximum amplitude value can be performed for the unused disk. Therefore, even if the optical pickup has no tilt sensor, the tilt control of the optical pickup can be performed precisely so that recording quality is improved when information is recorded on the unused disk.

DESCRIPTION OF THE PREFERRED EMBODIMENTS

Figure 1:
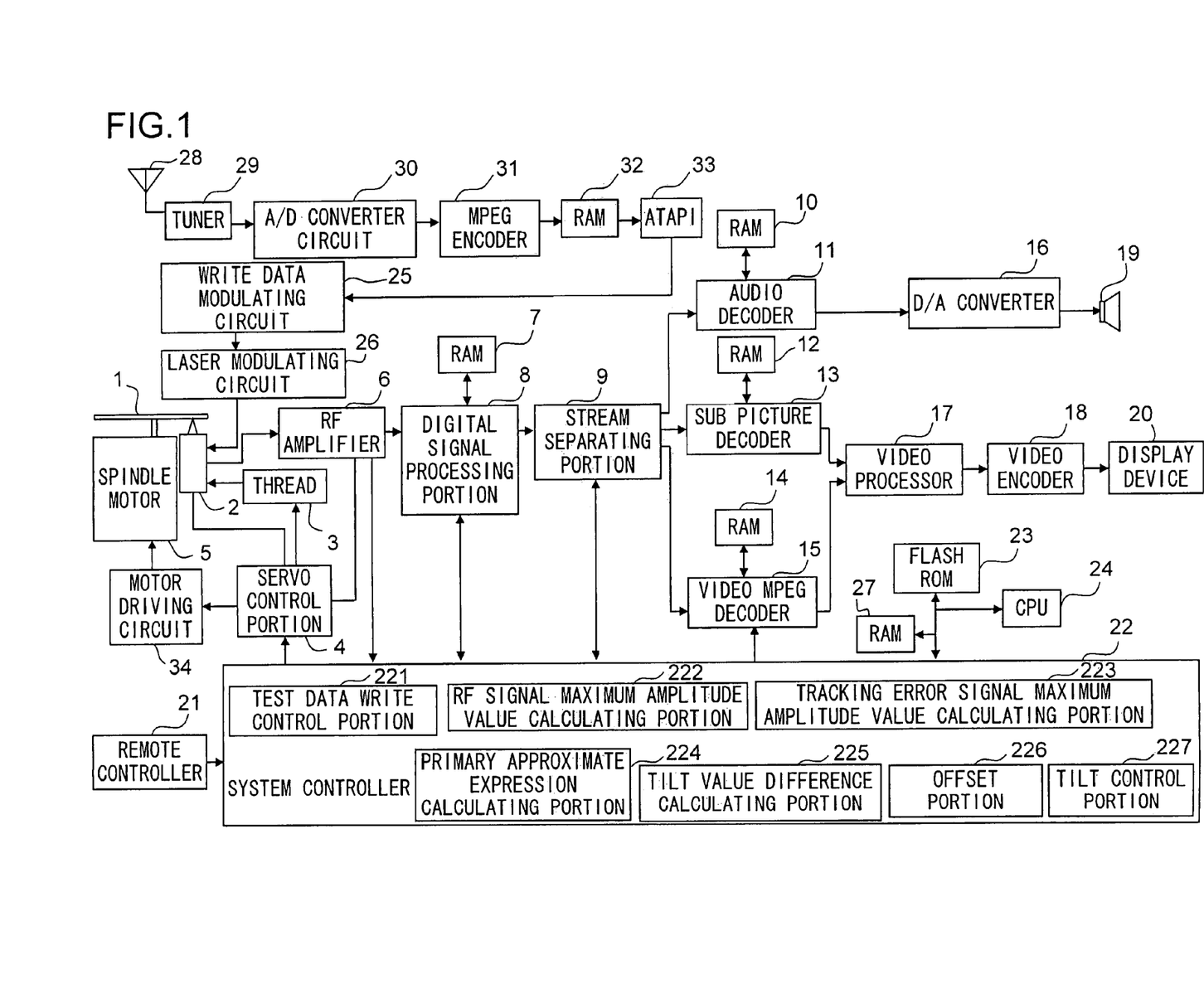
FIG. 1 is a block diagram showing a structure of an optical disk recording and reproducing device according to an embodiment of the present invention.

Now an embodiment of the present invention will be described with reference to the attached drawings. FIG. 1 is a block diagram showing a structure of an optical disk recording and reproducing device according to an embodiment of the present invention.

This optical disk recording and reproducing device is equipped with a system controller 22 for controlling a whole device, a spindle motor 5 for rotating an optical disk 1, an optical pickup 2 for writing and recording information on the optical disk 1, a thread 3 for moving the optical pickup 2 in the radial direction of the optical disk 1, and a servo control portion 4 for driving the spindle motor 5 and the thread 3 via a motor driving circuit 34 and moving an objective lens (not shown) embedded in the optical pickup 2 so that a focus position of a laser beam is moved with respect to a recording surface of the optical disk 1 in the vertical direction and in the horizontal direction in accordance with an instruction from the system controller 22.

In addition, this optical disk recording and reproducing device is equipped with an RF amplifier 6 for amplifying an RF signal that is a read signal from the optical pickup 2 when the optical disk 1 is read, a digital signal processing portion 8 for converting the RF signal outputted from the RF amplifier 6 into digital data and for performing a signal modulating process in accordance with a data format of the optical disk I and an error correcting process by an ECC block so that the generated data is stored in a RAM 7 as a reproducing buffer memory, and a stream separating portion 9 for separating audio data, sub picture data and video data from a data stream outputted from the digital signal processing portion 8 in accordance with an instruction of the system controller 22.

In addition, this optical disk recording and reproducing device is equipped with an audio decoder 11 for performing a predetermined decode process after receiving the audio data outputted from the stream separating portion 9, a RAM 10 for storing data temporarily for the audio decoder 11 to perform the decode process, a sub picture decoder 13 for performing a predetermined decode process after receiving the sub picture data outputted from the stream separating portion 9, a RAM 12 for storing data temporarily for the sub picture decoder 13 to perform the decode process, a video MPEG decoder 15 for performing a MPEG decode process after receiving the video data outputted from the stream separating portion 9, and a RAM 14 for storing data temporarily for the video MPEG decoder 15 to perform the decode process.

In addition, this optical disk recording and reproducing device is equipped with a video processor 17 for combining data outputted from the video decoder 15 and data outputted by the sub picture decoder 13 in accordance with an instruction from the system controller 22, a video encoder 18 for converting the composite data outputted from the video processor 17 into a video signal for display so that a display device 20 displays images, and a D/A converter 16 for converting the data outputted from the audio decoder 11 into an analog audio signal so as to supply the signal to a speaker 19 for example via an audio circuit (not shown).

In addition, this optical disk recording and reproducing device is equipped with a remote controller 21 including a record key for giving a record instruction to the system controller 22, a play key for giving a play instruction, a stop key for instructing a stop of recording or reproduction, and other various operational keys. Furthermore, this optical disk recording and reproducing device is equipped with a flash ROM 23 for storing programs and data for controlling each structural element of the device and controlling the whole device, a CPU 24 for performing operational processes so as to control the system controller 22 in accordance with the programs and data stored in the flash ROM-23, and a RAM 27 for storing data temporarily that are necessary for the CPU 24 to perform the operational processes.

In addition, this optical disk recording and reproducing device is equipped with a tuner 29 that is connected to an antenna 28, an A/D converter circuit 30 for converting analog video and audio signals of the television program selected by the tuner 29 or video and audio signals from a television receiver or other video and audio output devices (not shown) into digital video and audio data, a MPEG encoder 31 for encoding the video and audio data by MPEG, a RAM-32 as a buffer memory for storing temporarily a predetermined quantity of the encoded video and audio data (hereinafter referred to as encoded data), an ATAPI (AT Attachment Packet Interface) 33 that is an interface for connecting to a write data modulating circuit 25, the write data modulating circuit 25 for modulating the encoded data from the ATAPI 33 so as to record the data on the optical disk 1, a laser modulating circuit 26 for supplying the optical pickup 2 with a laser modulating signal in accordance with the modulated data modulated by the write data modulating circuit 25 so as to modulating a laser beam that is emitted from the optical pickup 2.

The system controller 22 is equipped with structural elements unique to the present embodiment, which include a test data write control portion 221 for writing test data in, a test writable area of an unused writable optical disk if it is determined that the optical disk is loaded, an RF signal maximum amplitude value calculating portion 222 for calculating a maximum amplitude value of the RF signal at inner radius on the optical disk when the test data are read out from the test writable area, a tracking error signal maximum amplitude value calculating portion 223 for calculating the maximum amplitude value of the tracking error signal at the inner radius on the optical disk and for calculating the maximum amplitude value of the tracking error signal at an outer radius on the optical disk, a primary approximate expression calculating portion 224 for calculating the primary approximate expression about the tilt from the calculated maximum amplitude value of the tracking error signal at the inner radius and the calculated maximum amplitude value of the tracking error signal at the outer radius, a tilt value difference calculating portion 225 for calculating a difference between the tilt values by subtracting the maximum amplitude value of the tracking error signal at the inner radius from the maximum amplitude value of the RF signal at the inner radius, an offset portion 226 for offsetting the difference between the tilt values to the primary approximate expression, and a tilt control portion 227 for performing the tilt control of the optical pickup 2 by using the RF signal of the virtual maximum amplitude value that is offsetted to the primary approximate expression.

Figure 2:
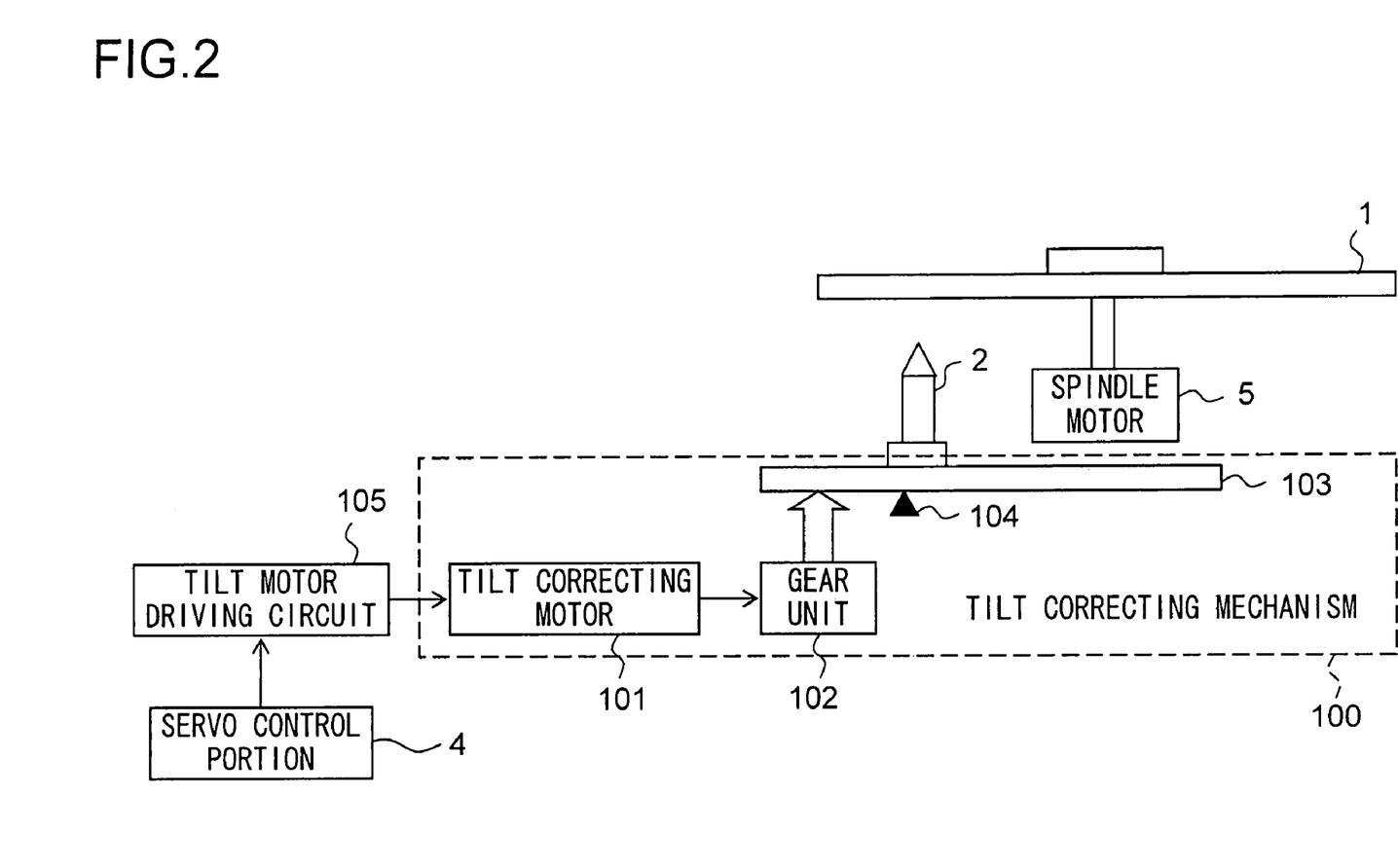
FIG. 2 is a block diagram showing a tilt correcting mechanism that is equipped to the optical disk recording and reproducing device according to the embodiment.

FIG. 2 is a block diagram showing a tilt correcting mechanism that is equipped to the optical disk recording and reproducing device according to the embodiment. In FIG. 2, a tilt correcting mechanism 100 includes a rotating chassis 103 that can rotate around a supporting point 104, a tilt correcting motor 101 that is driven to rotate by a tilt motor driving circuit 105, a gear unit 102 that cooperates with the tilt correcting motor 101 so as to rotate the rotating chassis 103 around the supporting point 104 in the right-handed direction or in the left-handed direction in the drawing within a predetermined rotation angle range. The tilt correcting mechanism 100 performs the correction so that the laser beam emitted by the optical pickup 2 is always directed to the optical disk 1 perpendicularly by tilting the optical pickup 2 around a spindle that is perpendicular to a radial direction of the optical disk 1 when information is recorded or reproduced on the optical disk 1.

The rotating chassis 103 is made of a material such as a galvanized steel sheet, and it is pressed downward and in the left-handed direction by a first leaf spring (not shown) that presses it in the direction toward the supporting point 104 (in the direction pressing the rotating chassis 103 downward in the drawing) and a second leaf spring (not shown) that presses the rotating chassis 3 by a spring force in the direction opposite to the gear unit 102 in the left-handed direction in the drawing.

Therefore, the gear unit 102 is controlled by the rotation (in the normal direction and in the reverse direction) of the tilt correcting motor 101, and corresponding to the control quantity the rotating chassis 103 rotates in the right-handed or the left-handed direction. Thus, the tilt of the optical pickup 2 with respect to the optical disk 1 is corrected.

Figure 3:
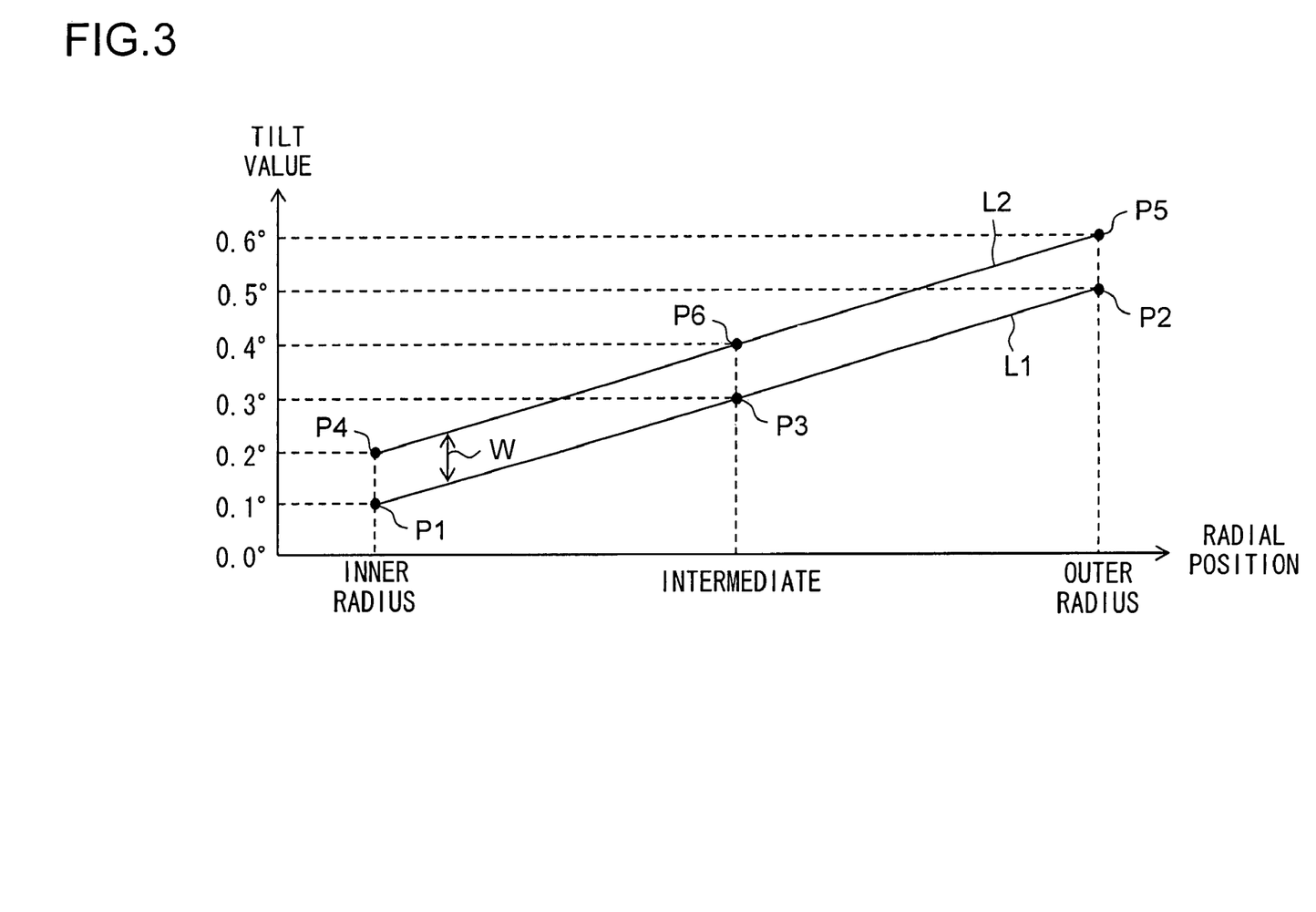
FIG. 3 is a graph showing an example of a relationship between the radial position of the optical disk and a tilt value of the optical pickup when a tracking error signal of the maximum amplitude value is obtained in the embodiment.

FIG. 3 is a graph showing an example of a relationship between the radial position of the optical disk and a tilt value of the optical pickup when a tracking error signal of the maximum amplitude value is obtained in the embodiment. In FIG. 3, reference P1 is a point indicating the tilt value at which the tracking error signal at the inner radius of the optical disk becomes the maximum amplitude value (TEMax), while reference P2 is a point indicating the tilt value at which the tracking error signal at the outer radius of the optical disk becomes the maximum amplitude value of (TEMax). Reference L1 indicates a line by the primary approximate expression about the tilt calculated from the points P1 and P2. This primary approximate expression indicates a tilt value (tilt angle) of the optical pickup with respect to a warp of the optical disk. According to this primary approximate expression, supposing that the tilt value (tilt angle) is 0.1 degrees for example at the point P1 of the inner radius, while the tilt value (tilt angle) is 0.5 degrees for example at the point P2 of the outer radius, the tilt value (tilt angle) is approximately 0.3 degrees at a point P3 of the intermediate radial position between the inner radius and the outer radius.

Further, in FIG. 3, reference P4 is a point indicating the maximum amplitude value of the RF signal (RFMax) at the inner radius of the optical disk, and a difference W between the points P4 and P1 indicates the difference between the tilt values. Reference L2 indicates a line by the virtual primary approximate expression indicating the tilt value corresponding to the RF signal of the virtual maximum amplitude value obtained by offsetting the difference between the tilt values W to the primary approximate expression. Point P5 on this line L2 indicates the tilt value obtained by offsetting the difference between the tilt values W to the point, P2. According to the virtual primary approximate expression, supposing that the tilt value (tilt angle) is 0.2 degrees for example at the point P4 of the inner radius, while the tilt value (tilt angle) is 0.6 degrees for example at the point P5 of the outer radius, the tilt value (tilt angle) is approximately 0.4 degrees at a point P6 of the intermediate radial position between the inner radius and the outer radius. Therefore, an actual tilt control is performed in accordance with the RF signal of the virtual maximum amplitude value on the line L2.

Figure 4:
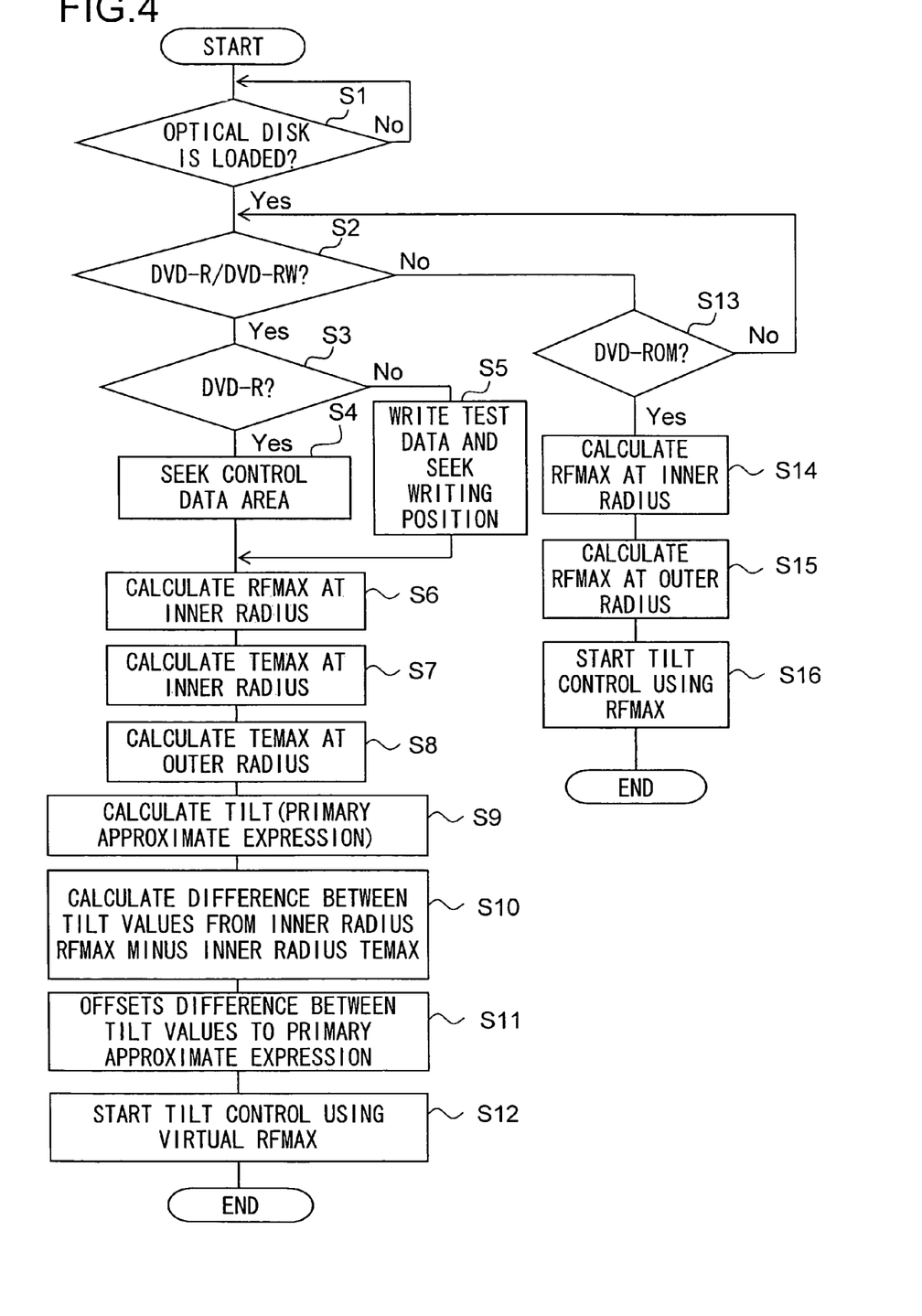
FIG. 4 is a flowchart for explaining a process until the tilt control is started in the embodiment.

FIG. 4 is a flowchart for explaining a process until the tilt control is started in the embodiment. With reference to this flowchart and FIGS. 1-3, a process until the tilt control is started will be described. Although a DVD-R or a DVD-RW is exemplified as the unused disk in the following description, it is not limited to them but can be a DVD+R, a DVD+RW or a DVD-RAM.

First, when an optical disk 1 is loaded to the optical disk recording and reproducing device, the system controller 22 detects the loaded optical disk 1 (Step S1). Furthermore, it is determined by disk information of the optical disk 1 which one of a DVD-R, a DVD-RW and a DVD-ROM the optical disk I is (Steps S2 and S13). If it is determined that the optical disk 1 is a DVD-R after it is determined that it is a DVD-R or a DVD-RW (Step S3), the test data write control portion 221 of the system controller 22 read out the test data that are stored in the flash ROM 23 in advance, and it supplies the test data to the write data modulating circuit 25 via the ATAPI 33. The write data modulating circuit 25 modulates the test data, and the laser modulating circuit 26 makes the optical pickup 2 modulates the laser beam emitted from it in accordance with the modulated test data. Thus, the optical pickup 2 writes the test data in a control data area of the DVD-R so as to seek the control data area (Step S4).

On the other hand, if it is determined that the optical disk 1 is not a DVD-R but a DVD-RW in the step S3, the test data write control portion 221 of the system controller 22 performs a similar control so as to write the test data in the data area in the designated inner radius of the DVD-RW. Thus, the optical pickup 2 writes the test data in the designated data area of the DVD-RW and seeks the writing position (Step S5).

Next, the RF signal maximum amplitude value calculating portion 222 of the system controller 22 makes the optical pickup 2 read out the test data written in the step S4 or S5 by moving the optical pickup 2 to the inner radius of the optical disk 1 for reading out the test data. The RF signal of the test data is amplified by the RF amplifier 6, and the amplified RF signal is used for calculating the maximum amplitude value of the RF signal (RFMax) at the inner radius of the optical disk (DVD-R or DVD-RW) 1 (Step S6).

After that, tracking error signal maximum amplitude value calculating portion 223 of the system controller 22 makes the RF amplifier 6 amplify the tracking error signal at the inner radius of the optical disk 1 outputted from the optical pickup 2. The amplified tracking error signal is used for calculating the maximum amplitude value of the tracking error signal (inner radius TEMax) at the inner radius of the optical disk 1 (Step S7). Further, the optical pickup 2 is moved to the outer radius of the optical disk 1. The tracking error signal at the outer radius of the optical disk 1 outputted from the optical pickup 2 is amplified by the RF amplifier 6. The amplified tracking error signal is used for calculating the maximum amplitude value of the tracking error signal (outer radius TEMax) at the outer radius of the optical disk 1 (Step S8).

Next, the primary approximate expression calculating portion 224 of the system controller 22 calculates the primary approximate expression about the tilt (a relationship between the radial position as shown by the line L1 in FIG. 3 and the tilt value when the tracking error signal of the maximum amplitude value is obtained) from the calculated maximum amplitude value of the tracking error signal at the inner radius and the calculated maximum amplitude value of the tracking error signal at the outer radius (Step S9). After that, the tilt value difference calculating portion 225 of the system controller 22 calculates the difference between the tilt values (W shown in FIG. 3) by subtracting the maximum amplitude value of the tracking error signal at the inner radius (the point P1 shown in FIG. 3) from the maximum amplitude value of the RF signal at the inner radius (the point P4 shown in FIG. 3) (Step S10).

After that, the offset portion 226 of the system controller 22 offsets the difference between the tilt values to the primary approximate expression (Step S11). Thus, the tilt value can be obtained in accordance with the RF signal of the virtual maximum amplitude value (virtual RFMax) on the line L2 as shown in FIG. 3. The tilt control portion 227 of the system controller 22 controls the tilt motor driving circuit 105 (see FIG. 2) via the servo control portion 4 based on the tilt value so as to rotate the tilt correcting motor 101 for starting the tilt control. In short, the tilt control portion 227 starts the tilt control using the virtual RFMax (Step S12).

In this way, the gear unit 102 of the tilt correcting mechanism 100 drives the rotating chassis 103 to tilt to an angle corresponding to the tilt value, so that the laser beam emitted from the optical pickup 2 for recording or reading information on the optical disk 1 to be directed to the optical disk 1 perpendicularly.

If it is determined that the loaded optical disk 1 is a DVD-ROM (Step S13), data is recorded on the DVD-ROM. Therefore, the RF signal can be obtained by reproducing data recorded on the DVD-ROM. Accordingly, the system controller 22 moves the optical pickup 2 to the inner radius of the DVD-ROM. The RF signal at the inner radius of the DVD-ROM outputted from the optical pickup 2 is amplified by the RF amplifier 6. The amplified RF signal is used for calculating the maximum amplitude value of the RF signal (inner radius RFMax) at the inner radius of the DVD-ROM (Step S14).

Next, the system controller 22 moves the optical pickup 2 to the outer radius of the DVD-ROM. The RF signal at the outer radius of the DVD-ROM outputted from the optical pickup 2 is amplified by the RF amplifier 6. This amplified RF signal is used for calculating the maximum amplitude value of the RF signal (outer radius RFMax) at the outer radius of the DVD-ROM (Step S15). After that, the system controller 22 starts the tilt control using the maximum amplitude value of the RF signal (RFMax) in accordance with the primary approximate expression obtained from the calculated maximum amplitude value of the RF signal at the inner radius (inner radius RFMax) and the maximum amplitude value of the RF signal at the outer radius (outer radius RFMax) (Step S16).

As described above, according to the present embodiment, the tilt value can be set also for an unused disk without the RF signal corresponding to the tilt value by the RF signal of the maximum amplitude value. Thus, the tilt control can be performed for an unused disk by the RF signal of the virtual maximum amplitude value. Therefore, even if the optical pickup has no tilt sensor, the tilt control of the optical pickup can be performed correctly, so recording quality is improved when information is recorded on the unused disk.

Although the first predetermined position of the optical disk is the inner radius while the second predetermined position of the same is the outer radius in this embodiment, the first predetermined position and the second predetermined position may be positions having an appropriate distance between them. If the optical disk has a warp in the radial direction, it is better that the first predetermined position is the inner radius while the second predetermined position is the outer radius. In addition, although the primary approximate expression is determined by calculating the maximum values of the tracking error signals at the inner radius and the outer radius of the optical disk in this embodiment, it is possible to determine the primary approximate expression by calculating the maximum values of the tracking error signals at other radial positions adding to the inner radius and the outer radius.

What is claimed is:

1. An optical disk recording and reproducing device having a tilt correcting mechanism for correcting so that a laser beam emitted from an optical pickup becomes perpendicular to the optical disk when information is recorded or reproduced on the optical disk, wherein the device is equipped with a system controller for performing a tilt control of the optical pickup by using an RF signal of a virtual maximum amplitude value that is obtained by the steps of:

calculating a primary approximate expression about a tilt from at least a first predetermined position and a maximum amplitude value of a tracking error signal at a second predetermined position on the optical disk, calculating a difference between the tilt values by subtracting the maximum amplitude value of the tracking error signal at the first predetermined position from the maximum amplitude value of the RF signal at the first predetermined position, and offsetting the difference between the tilt values to the primary approximate expression;

wherein the system controller includes;

a test data write control portion for writing test data in a test writable area of an unused writable optical disk if it is determined that the optical disk is loaded, an RF signal maximum amplitude value calculating portion for calculating a maximum amplitude value of the RF signal at the first predetermined position on the optical disk when the test data are read out from the test writable area, a tracking error signal maximum amplitude value calculating portion for calculating the maximum amplitude value of the tracking error signal at the first predetermined position on the optical disk and for calculating the maximum amplitude value of the tracking error signal at the second predetermined position that is a predetermined distance away from the first predetermined position, a primary approximate expression calculating portion for calculating the primary approximate expression about the tilt from the calculated maximum amplitude value of the tracking error signal at the first predetermined position and the calculated maximum amplitude value of the tracking error signal at the second predetermined position, a tilt value difference calculating portion for calculating a difference between the tilt values by subtracting the maximum amplitude value of the tracking error signal at the first predetermined position from the maximum amplitude value of the RF signal at the first predetermined position, an offset portion for offsetting the difference between the tilt values to the primary approximate expression, and a tilt control portion for performing the tilt control of the optical pickup by using the RF signal of the virtual maximum amplitude value that is offsetted to the primary approximate expression.

2. The optical disk recording and reproducing device according to claim 1, wherein the first predetermined position is an inner radius of the optical disk, while the second predetermined position is an outer radius of the optical disk.

* * * * *